Patented Nov. 4, 1930

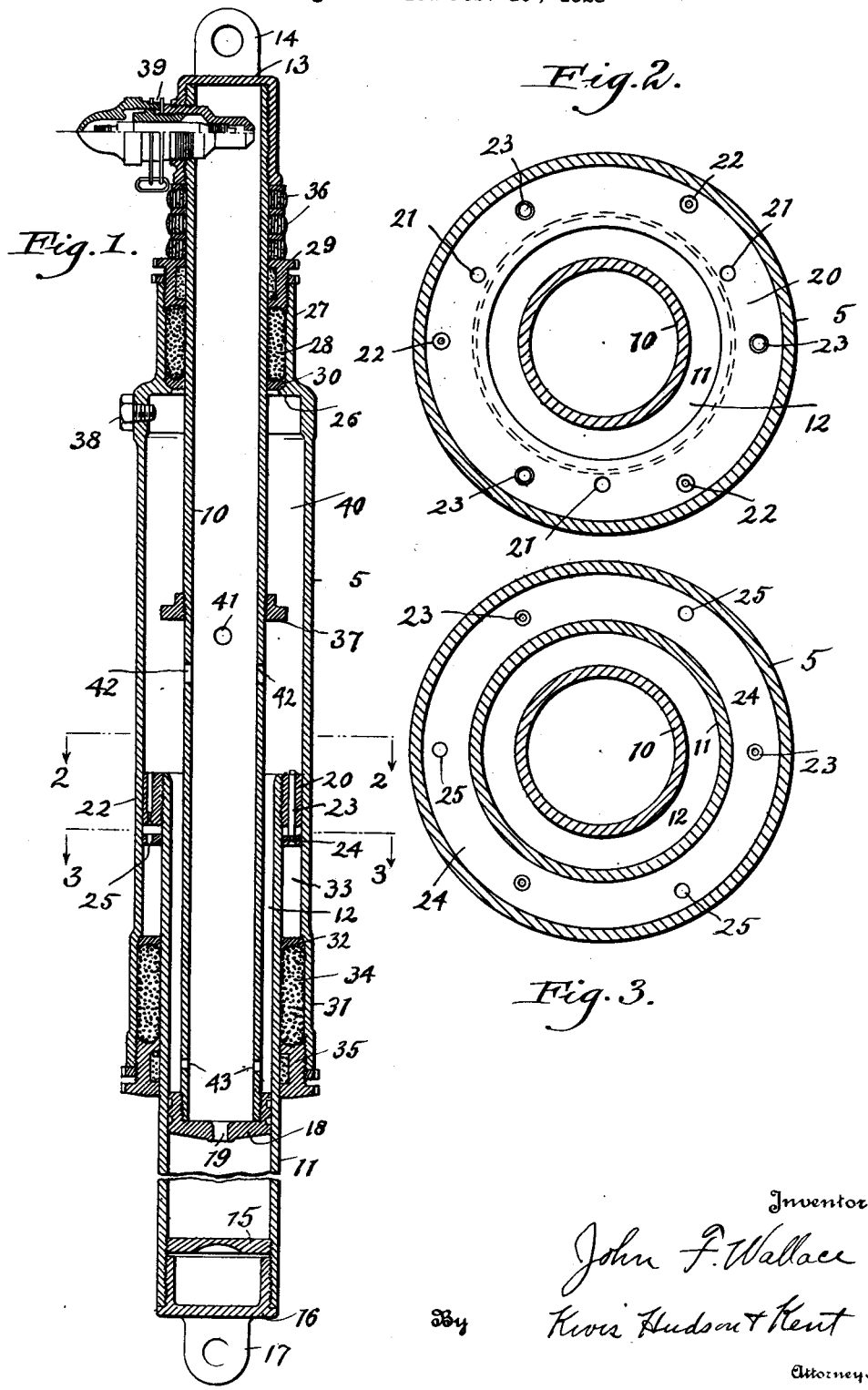

1,780,660

UNITED STATES PATENT OFFICE

JOHN F. WALLACE, OF SHAKER HEIGHTS, OHIO, ASSIGNOR TO THE CLEVELAND PNEUMATIC TOOL COMPANY, OF CLEVELAND, OHIO, A CORPORATION OF OHIO

SHOCK-ABSORBING STRUT FOR AIRCRAFT

Application filed February 15, 1928, Serial No. 254,326. Renewed August 28, 1930.

This invention relates to improvements in shock absorbing struts for aircraft.

It is an object of the invention to provide a strut in which there is a long total stroke available for the landing of an airplane or hydroplane, with a comparatively short stroke available for taxying, at which time the blows which must be absorbed by the strut are of much less force than the blow delivered thereto by the impact of landing. Struts of this character are of particular advantage in the case of low hung aircraft, that is those in which there is a small clearance between the ends of the wings and the ground or water when the plane is taxying.

Other objects and features of novelty will appear as I proceed with the description of that embodiment of the invention which, for the purposes of the present application, I have illustrated in the accompanying drawing, in which Fig. 1 is a longitudinal sectional view of a combined hydraulic and pneumatic strut embodying the invention;

Fig. 2 is a cross sectional view, on a larger scale, the section being taken substantially on the line 2—2 Fig. 1; and Fig. 3 is a similar view taken substantially on the line 3—3, Fig. 1.

In the drawing, there are illustrated two principal telescoping parts, that is a cylinder 10 of relatively small diameter and a cylinder 11 of a diameter large enough to provide a substantial clearance space 12 between the two cylinders.

At its upper end the cylinder 10 is closed by a threaded cap 13 which provides a fixed cylinder head and may be formed with a perforated lug 14 by means of which the strut may be attached to a wing or other relatively immovable part of an airplane or hydroplane.

The cylinder 11 may be closed at its lower end by a plug 15 and, additionally, by a cup-shaped plug 16 carrying an attaching lug 17 for connection with the running gear of an airplane or a float of a hydroplane.

Upon the lower end of cylinder 10 there is threaded a head 18 which centers the two cylinders with respect to each other and serves to seal the space within the lower part of cylinder 11 from the annular clearance space 12. This head 18 contains an opening 19 which permits a somewhat restricted flow of fluid between the interiors of the two cylinders. In order to avoid confusion in the description of the operation of the strut, I prefer not to regard the perforated head 18 as a piston head, but merely as a sliding partition between the cylinders 10 and 11.

On its upper end the cylinder 10 is exteriorly threaded to take a piston head 20. This piston head has a series of unobstructed passages 21 therethrough, a series of restricted passages 22 and a further series of perforations in which pins 23 having cotter pins extending through their upper ends are mounted for slight longitudinal movement. Each pin 23 at its lower end is reduced and riveted onto a valve ring 24 which is provided with ports 25 located opposite the restricted passages 22 of the piston head. This valve construction is similar to that more specifically described in my co-pending application, Serial No. 238,837, filed December 9, 1927.

In addition to the annular piston head 20, just referred to, the cylinder 11 has also a smaller circular piston head constituted by the plug 15, these two piston heads being both fixed to the cylinder 11 and, therefore, moving together.

Outside of both of the telescoping parts 10 and 11 there is mounted a cylindrical housing 5 which slidably engages the cylinders 10 and 11 and in which the piston 20 slides at times. The upper end of the housing 5 has an annular cylinder head 26 behind which is a packing gland 27 enclosing a packing 28, the gland 27 being threaded to receive a gland nut 29. The inner end of the packing bears against a packing retainer ring 30 which preferably is exposed to the interior of the housing and forms a portion of the annular cylinder head 26.

Near the lower end of the housing 5 there is a slight enlargement forming a packing gland 31. The shoulder between the gland 31 and the housing proper serves as an abutment for a packing retainer ring 32. This ring is exposed to the annular chamber 33 behind the piston head 20 and constitutes a second annular cylinder head for the housing 5 of smaller area than the head 26. The gland 31 encloses packing 34 which is held in place by a gland nut 35 threaded into the gland 31, as shown.

Upward movement of the housing 5 is stopped by the cap 13 with rubber rings 36 preferably interposed to absorb some of the shock and deaden the noise. Movement of the housing in the opposite direction is stopped by a collar 37 which is threaded onto the cylinder 10 about midway of its length, this collar being shaped preferably to engage first with the packing retainer 30 for compression of the packing 28.

In the upper end of the housing 5 I locate an oil filling hole and provide a threaded plug 38 for closing the same. Near the upper end of cylinder 10 I mount an air valve and cap 39 of any suitable construction.

The chamber 40 within the upper end of housing 5 might be entirely separate from the chamber within cylinder 10 so far as the functioning of the strut is concerned, but I prefer to have these two chambers intercommunicating inasmuch as by this means one set of oil and air filler openings suffice for the entire strut. To this end I form holes 41, 42 in cylinder 10 in the vicinity of collar 37 and holes 43 in the same cylinder near its lower end.

*Operation.*—Assuming that the strut is assembled upon a plane between the parts thereof whose relative movements it is desired to cushion, the plug 38 being removed, cylinders 10 and 11 will be telescoped together as far as they will go, that is with the piston head 20 engaging the collar 37. The strut is then filled with oil or some other non-compressible fluid up to the level of the oil filler hole, and plug 38 is again put in place. An air pressure line is then connected with the air valve 39 and air under pressure is admitted to the strut expanding the same against the weight of the plane until the parts assume substantially the position shown in Fig. 1. In this process the pressure admitted into cylinder 10 is, of course, transmitted to chamber 40 and through the passages in piston head 20 and ports 25 in valve 24 into chamber 33. Owing to the fact that the area of cylinder head 26 is greater than the area of ring 32, the housing 5 will be raised by the pressure in the strut until it is stopped by the rubber rings 36 bearing against the cap 13.

Now when the airplane leaves the ground or the hydroplane leaves the water, the load on the plane is removed from the strut and the latter expands fully due to its internal pressure. In this expanding movement pressure acts upon the piston head 15 and the piston head 20, causing the valve ring 24, backed by the piston head 20, to engage the packing retainer ring 32 and thereby move the housing 5 downwardly until it is stopped by engagement with the collar 37. This movement results from the fact that the combined areas of piston head 20 and piston head 15 considerably exceed the area of the annular cylinder head 26.

When the plane makes a landing the impact is delivered through the running gear or float, as the case may be, to the cylinder 11, causing that cylinder to rise rapidly with respect to the plane. Oil is thereby forced to flow from the chamber within the lower part of cylinder 11 into cylinder 10 and thence into chamber 40. As the piston 20 moves upwardly the pressure in chamber 40 is permitted to raise the housing 5 so that it moves in unison with the cylinder 11. The fluid in chamber 40, therefore, is not compressed by the piston head 20 at this time but is merely elevated by it. The size of the opening 19, which may be varied to suit different conditions, controls the speed of movement and the resultant degree of cushioning during the first portion of the landing stroke. As soon as the upper end of the housing 5 engages the rubber rings 36 and comes to a stop, further upward movement of the piston head 20 is resisted by the pressure in chamber 40 so that from this time on upward movement or the compression of the strut is resisted by the piston 15 working against the column of fluid which is backed by the cylinder head 13 and also by the piston head 20 working against the column of fluid which is backed by the cylinder head 26. Upward movement of the piston 20 is facilitated somewhat by the passages 21 and 22 in the piston head 20 which permit oil to flow through the piston into the annular space 33, the valve ring 24 being then in the position illustrated in Fig. 1. The pressure within the strut is such that the upward movement of the piston 20 will ordinarily stop before collar 37 is reached. After the upward movement is terminated the energy absorbed by the highly compressed air trapped above the oil in the strut starts to dissipate itself, and in doing so exerts downward pressure on the pistons 15 and 20. The tendency toward a very rapid rebound stroke is counteracted partly by the somewhat restricted hole 19, but more particularly by the valve ring 24 which immediately rises into contact with the piston 20 thereby closing off the passages 21. The oil in chamber 33 is thus forced to flow only through the restricted passages 22 whereby a slow and smooth rebound is assured. If the rebound stroke is sharp enough, the pressure in chamber 33 may be enough greater than that in chamber 40 to overcome the difference in area between ring 32 and cylinder head 36 and thus carry the housing 5 downwardly for a short distance. Greater resistance to the movement of the rebound may be thus momentarily set up.

After the landing is made and the plane is taxying, the housing 5 will remain in its upper position, shown in Fig. 1, and all of the shocks are taken upon both of the pistons 15 and 20 as distinguished from the condition during the first portion of the landing stroke when the shock is taken solely by the piston 15.

When the plane is in the air, outward pressure is brought to bear upon the packing retainer rings 30 and 32, whereby packings 28 and 34 are compressed, thus effecting a very tight seal. At other times the rings 30 and 32 respond to the pressures within the strut and thus the tightness of the seal is automatically regulated. This feature of the construction, however, is not a part of the present invention.

A shock absorbing strut for accomplishing results similar to those accomplished by the present invention is disclosed in my co-pending application, Serial No. 238,837, filed December 9, 1927.

While in the foregoing description and accompanying drawing I have set forth the invention with more or less particularity, I desire it to be understood that such disclosure is for purposes of illustration only and is not intended to limit the invention in any way

Having thus described my invention, I claim:

1. In a shock absorbing strut for aircraft, two telescoping parts adapted to be secured to the portions of the aircraft whose relative movements are to be cushioned, one of said telescoping parts comprising two piston heads movable together in fixed relation, and means carried by the other telescoping part for opposing the movement of one piston head throughout the stroke caused by the impact of landing and for opposing movement of the other piston head throughout only the latter part of said stroke.

2. In a shock absorbing strut for aircraft, two telescoping parts adapted to be secured to the portions of the aircraft whose relative movements are to be cushioned, one of said telescoping parts comprising two piston heads movable together in fixed relation, the other of said telescoping parts having a fixed cylinder head opposing the movement of one piston head and a movable cylinder head opposed to the movement of the other piston head, said last named telescoping part having also an abutment for stopping the movement of said movable cylinder head after the stroke caused by the impact of landing has been partially completed.

3. In a shock absorbing strut for aircraft, two telescoping parts adapted to be secured to the portions of the aircraft whose relative movements are to be cushioned, one of said telescoping parts comprising two piston heads movable together in fixed relation, the other of said telescoping parts having a fixed cylinder head opposing the movement of one piston head and a movable cylinder head opposed to the movement of the other piston head, said last named telescoping part having also an abutment for stopping the movement of said movable cylinder head after the stroke caused by the impact of landing has been partially completed, and valve means for delaying the rebound of the relative movement between said second piston head and movable cylinder head.

4. In a shock absorbing strut for aircraft, a telescoping part having two piston heads secured thereto, a cylinder and fixed cylinder head in opposition to which one of said piston heads acts during the initial portion of the compression stroke, and a cylinder and cylinder head for the second piston head, said last named cylinder head being movable with the second piston head during the said initial portion of the compression stroke, and means to stop the movement of said second cylinder head after the completion of the said initial portion of the stroke.

5. In a shock absorbing strut for aircraft, two telescoping parts adapted to be secured to the portions of the aircraft whose relative movements are to be cushioned, the first telescoping part comprising a cylinder and fixed cylinder head, a cylindrical housing floating upon said telescoping parts and having fluid-tight sliding joints at its ends, one end of said housing constituting a cylinder head, said second telescoping part having two piston heads, one acting in opposition to said fixed cylinder head and the other acting in opposition to the cylinder head of said floating housing, and a stop on said first telescoping part to limit the movement of said housing in one direction, whereby the movement of said first piston is opposed throughout the compression stroke and the movement of the second piston is opposed only during the latter part of the compression stroke.

6. In a shock absorbing strut for aircraft, two telescoping cylinders adapted to be secured to the portions of the aircraft whose relative movements are to be cushioned, a cylindrical housing floating upon said telescoping cylinders and having at its ends annular heads slidably contacting with the two telescoping cylinders, said heads being of different areas, the larger of said telescoping cylinders carrying a piston head working in said cylindrical housing, and a stop on the smaller telescoping cylinder for limiting the outward movement of the cylindrical housing thereon.

7. In a shock absorbing strut for aircraft, two telescoping cylinders adapted to be secured to the portions of the aircraft whose relative movements are to be cushioned, a cylindrical housing floating upon said telescoping cylinders and having at its ends annular heads slidably contacting with the two telescoping cylinders, said heads being of different areas, the larger of said telescoping cylinders carrying a piston head working in said cylindrical housing, said piston head having passages therethrough, and valve means for obstructing the flow of fluid through the piston head in one direction.

8. In a shock absorbing strut for aircraft, two telescoping cylinders adapted to be secured to the portions of the aircraft whose relative movements are to be cushioned, a cylindrical housing floating upon said telescoping cylinders spaced laterally from each of them and having at its ends annular heads slidably contacting with the two telescoping cylinders, the larger of said telescoping cylinders carrying a piston head working in said cylindrical housing, said piston head having restricted passages therethrough.

In testimony whereof, I hereunto affix my signature.

JOHN F. WALLACE.